(12) United States Patent
Toriumi (10) Patent No.: US 9,936,011 B2
(45) Date of Patent: Apr. 3, 2018

(54) DISTRIBUTED DATABASE, METHOD OF SHARING DATA, PROGRAM STORING MEDIUM, AND APPARATUS FOR A DISTRIBUTED DATABASE

(71) Applicant: CASIO COMPUTER CO., LTD., Shibuya-ku, Tokyo (JP)

(72) Inventor: Hideyuki Toriumi, Koshigaya (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 464 days.

(21) Appl. No.: 14/633,233

(22) Filed: Feb. 27, 2015

(65) Prior Publication Data

US 2015/0312334 A1    Oct. 29, 2015

(30) Foreign Application Priority Data

Apr. 24, 2014  (JP) .................................. 2014-089700

(51) Int. Cl.
| | | |
|---|---|---|
| G06F 15/16 | (2006.01) |
| H04L 29/08 | (2006.01) |
| H04M 3/51 | (2006.01) |
| H04L 12/26 | (2006.01) |
| H04L 12/24 | (2006.01) |

(52) U.S. Cl.
CPC ...... *H04L 67/1059* (2013.01); *H04L 41/0893* (2013.01); *H04L 43/0817* (2013.01); *H04L 67/104* (2013.01); *H04M 3/51* (2013.01); *H04L 67/108* (2013.01); *H04M 2203/402* (2013.01); *H04M 2203/558* (2013.01)

(58) Field of Classification Search
CPC ............. H04M 3/51; H04M 2203/402; H04M 2203/558; H04L 67/104; H04L 67/108; H04L 67/1059
USPC ......................................... 709/203, 224, 201
See application file for complete search history.

(56) References Cited

U.S. PATENT DOCUMENTS

| | | |
|---|---|---|
| 7,801,912 B2 | 9/2010 | Ransil et al. |
| 8,250,230 B2 | 8/2012 | Kaler et al. |
| 8,832,281 B2 | 9/2014 | Dorso |
| 2009/0172157 A1* | 7/2009 | Zhang ................... H04L 67/104 709/224 |

(Continued)

FOREIGN PATENT DOCUMENTS

| | | |
|---|---|---|
| JP | 2012-146312 | 8/2012 |
| JP | 5118059 | 1/2013 |

(Continued)

OTHER PUBLICATIONS

Japanese Office Action for Japanese Patent Application No. 2014-089700 dated May 17, 2016.

*Primary Examiner* — Kyung H Shin
(74) *Attorney, Agent, or Firm* — Amin, Turocy & Watson LLP (57) ABSTRACT

A distributed database of a peer-to-peer network is provided. In the network, a group is composed of plural nodes, and the nodes in the group each have CPU and a state list memory. CPU of each node sends other node a request for information to obtain and store node-state information. The node-state information is delivered through a prescribed route among the nodes in the group. When the number of nodes participating in the group increases more than a prescribed number, the participating nodes are separated into plural groups.

11 Claims, 10 Drawing Sheets

(56) References Cited

U.S. PATENT DOCUMENTS

2011/0153634 A1 6/2011 Chu et al.
2014/0129617 A1* 5/2014 Barinov .................. H04M 3/51
  709/203

FOREIGN PATENT DOCUMENTS

JP    2013-514733    4/2013
JP    2013-516900    5/2013

* cited by examiner

▨ : INFORMATION NOT OBTAINED, UNKNOWN
○ : INFORMATION OBTAINED
□ : INFORMATION EXPECTED TO OBTAIN

NODE-STATE LISTS
N1 N2 N3 N4

N1 — NODE 1  ▨▨▨▨
N2 — NODE 2  ▨▨▨▨
N3 — NODE 3  ▨▨▨▨
N4 — NODE 4  ▨▨▨▨

FIG.7B

NODE-STATE LISTS
N1 N2 N3 N4

N1 — NODE 1  ○ □ ▨ ◇   SEND REQUEST TO N2 / RECEIVE REQUEST FROM N4
N2 — NODE 2  ◇ ○ □ ▨   SEND REQUEST TO N3 / RECEIVE REQUEST FROM N1
N3 — NODE 3  ▨ ◇ ○ □   SEND REQUEST TO N4 / RECEIVE REQUEST FROM N2
N4 — NODE 4  □ ▨ ◇ ○   SEND REQUEST TO N1 / RECEIVE REQUEST FROM N3

FIG.7C

NODE-STATE LISTS
N1 N2 N3 N4

N1 — NODE 1  ○ ○ ▨ ○   SEND REQUEST TO N2 / RECEIVE REQUEST FROM N4
N2 — NODE 2  ○ ○ ○ ▨   SEND REQUEST TO N3 / RECEIVE REQUEST FROM N1
N3 — NODE 3  ▨ ○ ○ ○   SEND REQUEST TO N4 / RECEIVE REQUEST FROM N2
N4 — NODE 4  ○ ▨ ○ ○   SEND REQUEST TO N1 / RECEIVE REQUEST FROM N3

FIG.7D

NODE-STATE LISTS
N1 N2 N3 N4

N1 — NODE 1  ○ ○ ○ ○   SEND REQUEST TO N2 / RECEIVE REQUEST FROM N4
N2 — NODE 2  ○ ○ ○ ○   SEND REQUEST TO N3 / RECEIVE REQUEST FROM N1
N3 — NODE 3  ○ ○ ○ ○   SEND REQUEST TO N4 / RECEIVE REQUEST FROM N2
N4 — NODE 4  ○ ○ ○ ○   SEND REQUEST TO N1 / RECEIVE REQUEST FROM N3

FIG.7E

▨ : INFORMATION NOT OBTAINED, UNKNOWN
○ : INFORMATION OBTAINED
□ : INFORMATION EXPECTED TO OBTAIN
◇ : INFORMATION EXPECTED TO RECEIVE

▨ : INFORMATION NOT OBTAINED, UNKNOWN
○ : INFORMATION OBTAINED

DISTRIBUTED DATABASE, METHOD OF SHARING DATA, PROGRAM STORING MEDIUM, AND APPARATUS FOR A DISTRIBUTED DATABASE

CROSS-REFERENCE TO RELATED APPLICATION

The present application is based upon and claims the benefit of priority from the prior Japanese Patent Application No. 2014-089700, filed Apr. 24, 2014, the entire contents of which are incorporated herein by reference.

BACKGROUND OF THE INVENTION

1. Field of the Invention

The present invention relates to a technology of a distributed database, and more particularly, to a technology of a distributed database of a peer-to-peer network which is composed of plural database servers, wherein the plural database servers consist plural participating nodes, respectively.

2. Description of the Related Art

A technology is widely known, of using a distributed database in peer-to-peer computer operation environment. The typical peer-to-peer computer operation environment is composed of plural peer computer systems, each of which is said to form a node having various abilities for connection with other nodes, as disclosed by Japanese Unexamined Patent Publication (Translation of PCT Application) No. 2013-516900.

The typical distributed database is connected with the peer-to-peer computer environment for peers to share data, as described in said Japanese Unexamined Patent Publication No. 2013-516900.

A user computer forms a node in the peer-to-peer computer environment to participate in the peer-to-peer computer environment. The user computer inputs an Internet Protocol address to a web-browser application to access other server through the Internet.

The web-browser application receives a domain name from the user computer to make contact with Domain Name System (DNS) server initially, and redirects to a real IP address by using a binary identifier. The web-browser application is used to access a web page hosted in a server farm, and participates in the peer-to-peer computer environment to host web pages and other services in place of the sever farm.

Meanwhile, in the distributed database of a peer-to-peer network composed of plural database servers to be said to form plural nodes, each node is required to understand life/death states of all other participating nodes. All the participating nodes in operation hold data separately and a node in halt is deleted from a group for holding data separately. Therefore, every node is required to hold information of all the nodes such as the life/death states.

Some methods of sharing information among the nodes use a gossip protocol, as disclosed by Japanese Patent Registration No. 5118059.

Further, Japanese Unexamined Patent Publication No. 2012-146312 discloses a technology concerning a peer-to-peer network system, in which plural peers (nodes) in a group communicate with other peers and store a membership list of the peers registered in the group to share information among them.

As described above, in the general distributed database, plural nodes compose one group. One of the nodes in the group communicates with other node to obtain information of said other node together with information which was previously obtained by said other node. In this manner, the node can obtain information of many nodes from other node by the little number of times of communications with other node. Each node in the group can obtain information of the whole group by repeatedly communicating with other node. To obtain information of the whole group, the node to communicate with is selected at random.

In the above distributed database, when the nodes to be linked are selected at random, it is possible to increase the number of nodes to be communicated with and to concentrate tasks on such nodes. The concentration of tasks can make such nodes delay in response and/or halt their operations. On the contrary, some nodes are selected and information of such nodes cannot be shared. Therefore, various inconveniences are invited by selecting nodes at random.

In the conventional distributed database, examples of general communicating operation for inquiring about information will be described beforehand with reference to FIG. 5A to FIG. 5F and FIG. 6A to 6E. FIG. 5A to FIG. 5F correspond to FIG. 6A to 6E, respectively. FIG. 5F is a view of explanatory notes of symbols used in FIG. 5A to FIG. 5E.

Figure 6A:
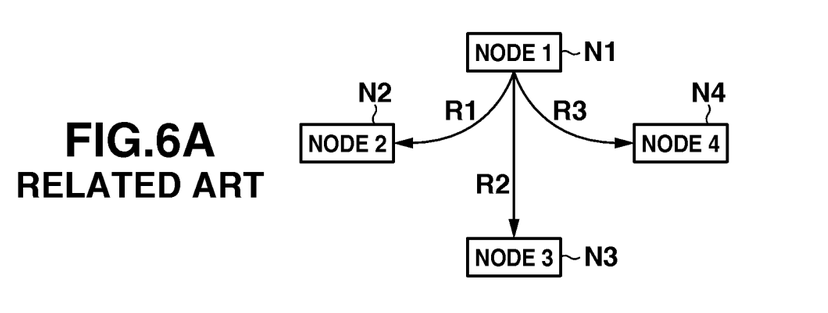
FIG. 6A is a view illustrating operations of requesting for information (Prior Art).

As shown in FIG. 6A, it is assumed that four nodes: [N1], [N2], [N3], and [N4] participate. The node [N1] periodically sends requests R1, R2, R3 for information, to other nodes [N2], [N3], and [N4], at random. Similarly, other nodes periodically send requests for information to the other nodes at random.

In FIG. 5F, a symbol of "slashed square" indicates "information having not been obtained" or "unknown", a symbol of "white round" indicates "information having been obtained", and a symbol of "white square" indicates "information expected to obtain". In FIG. 5A to FIG. 5E, information 10 held by the respective nodes is illustrated by the symbols. Hereinafter, the information 10 held by the respective nodes is referred to as a "node-state list(s)".

Figure 5A:
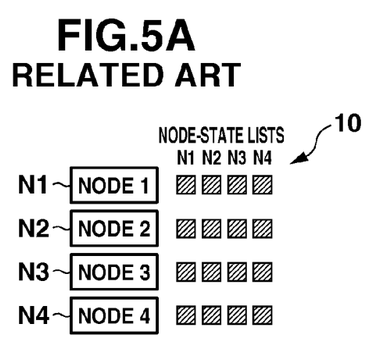
FIG. 5A is a view of node-state lists of four nodes in the initial state (Prior Art).

FIG. 5A is a view showing that the four nodes are in the initial state and share no information.

Figure 5B:
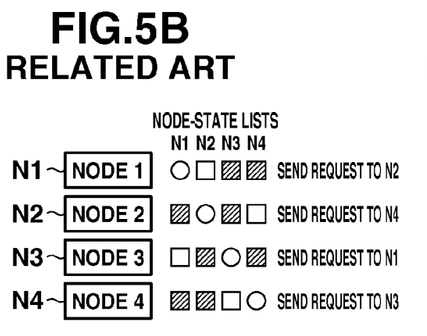
FIG. 5B is a view of the node-state lists of the four nodes (Prior Art).
Figure 6B:
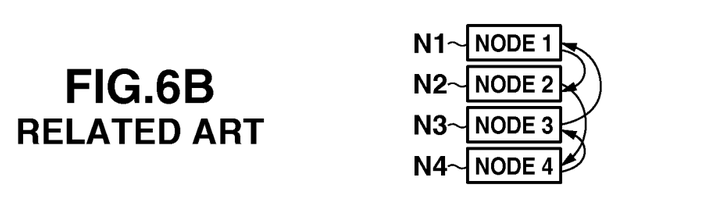
FIG. 6B is a view illustrating operations of requesting for information (Prior Art).

FIG. 5B and FIG. 6B are views showing that the four nodes are in the following state. More particularly, the node [N1] sends a request for information to the node [N2], the node [N2] sends a request for information to the node [N4], the node [N3] sends a request for information to the node [N1], and the node N4 sends a request for information to the node [N3].

Figure 5C:
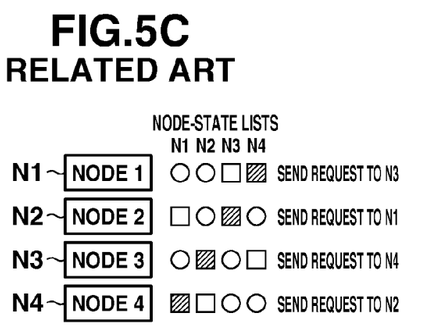
FIG. 5C is a view of the node-state lists of the four nodes (Prior Art).
Figure 6C:
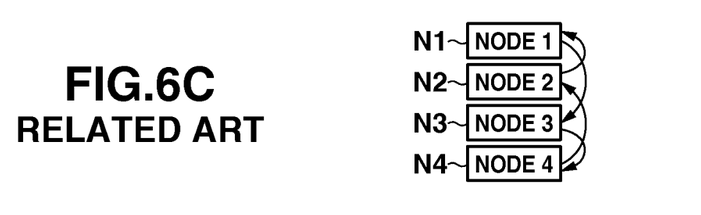
FIG. 6C is a view illustrating operations of requesting for information (Prior Art).

FIG. 5C and FIG. 6C are views showing that the four nodes are in the further following state. More particularly, the node [N1] sends a request for information to the node [N3], the node [N2] sends a request for information to the node [N1], the node [N3] sends a request for information to the node [N4], and the node [N4] sends a request for information to the node [N2].

Figure 5D:
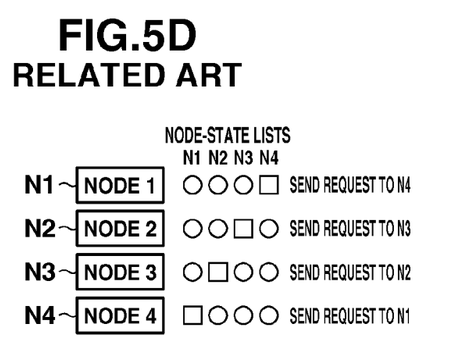
FIG. 5D is a view of the node-state lists of the four nodes (Prior Art).
Figure 6D:
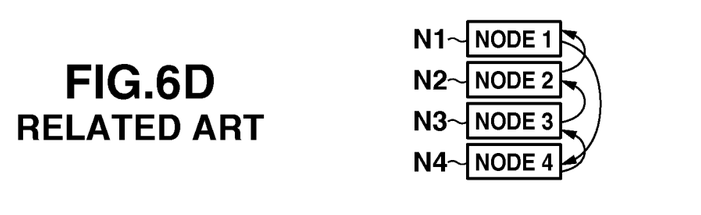
FIG. 6D is a view illustrating operations of requesting for information (Prior Art).

FIG. 5D and FIG. 6D are views showing that the four nodes are in the further following state. More particularly, the node [N1] sends a request for information to the node [N4], the node [N2] sends a request for information to the node [N3], the node [N3] sends a request for information to the node [N2], and the node [N4] sends a request for information to the node [N1].

Figure 5E:
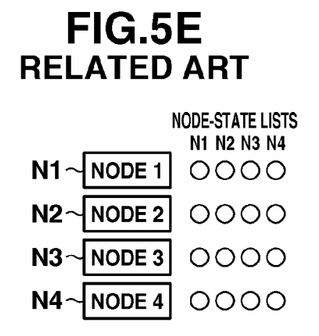
FIG. 5E is a view of the node-state lists of the four nodes in the steady state (Prior Art).
Figure 5F:
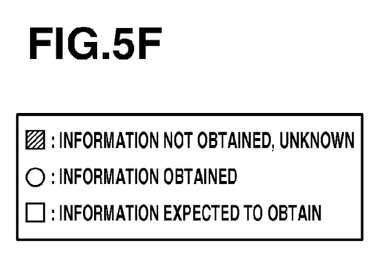
FIG. 5F is a view of explanatory notes of symbols used in FIG. 5A to FIG. 5E.

FIG. 5E is a view showing that the four nodes have shared information and are brought into the steady state.

Figure 6E:
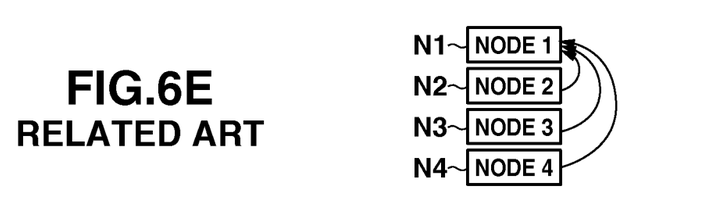
FIG. 6E is a view illustrating operations of requesting for information (Prior Art).

Since the node to which the request is sent is selected at random, the requests from the [N2], [N3] and [N4] can concentrate on the node [N1] as shown in FIG. 6E. Further, it is possible that the requests for information are continuously sent only to the same node, resulting in inefficient operation in sharing information.

In the distributed database of a peer-to-peer network in which plural nodes are linked to one another, the present invention relates to a technology in which respective nodes obtain information of other nodes and share the information effectively.

SUMMARY OF THE INVENTION

According to one aspect of the invention, there is provided a distributed database of a peer-to-peer network in which a group is composed of plural nodes, wherein the plural nodes in the group each have CPU and a state list memory, the state list memory stores node-state information which CPU of one of the plural nodes has obtained from other node by sending a request for information, CPU of each of the plural nodes delivers the node-state information through a prescribed route among the nodes in the group, and when the number of nodes participating in the group increases more than a prescribed number, the participating nodes are separated into plural groups.

According to other aspect of the invention, there is provided a method of sharing data in a distributed database of a peer-to-peer network which is composed of plural nodes, the method which comprises a first process of registering plural nodes in a group, a second process of delivering information through a prescribed route within the group, whereby the information is obtained and shared among the plural nodes in the group, and a third process of separating the nodes into plural groups, when the number of nodes participating in the group has increased more than a prescribed number.

According to another aspect of the invention, there is provided a non-transitory computer-readable storage medium with an executable program stored thereon, wherein the program is for sharing information in a distributed database of a peer-to-peer network composed of plural nodes, each node having a computer, and instructs the computer of a node [N] to perform the following processes: a process which registers plural nodes in a group; a process which sends a node [N+1] a request for information together with list-information of the node [N], wherein the list-information of the node [N] indicates a state of the node [N]; a process which receives a response from the node [N+1], wherein the response contains the list-information of the node [N] added with the list-information of the node [N+1]; a process which adds the information received from the node [N+1] to the list-information of the node [N]; a process which sends back a response to a node [N−1] in response to a request from the node [N−1], wherein the response contains the list-information sent from the node [N−1] added with the list-information of the node [N]; and a process which separates participating nodes into plural groups when the number of participating nodes has increased more than a prescribed number.

An apparatus for sharing information in a distributed database of a peer-to-peer network composed of plural nodes, wherein a node [N] among the plural nodes has a computer which performs the following processes: a process which registers plural nodes in a group; a process which sends a node [N+1] a request for information together with list-information of the node [N], wherein the list-information of the node [N] indicates a state of the node [N]; a process which receives a response from the node [N+1], wherein the response contains the list-information of the node [N] added with the list-information of the node [N+1]; a process which adds the information sent from the node [N+1] to the list-information of the node [N]; a process which sends back a response to a node [N−1] in response to a request from the node [N−1], wherein the response contains the list-information sent from the node [N−1] added with the list-information of the node [N]; and a process which separates participating nodes into plural groups when the number of participating nodes has increased more than a prescribed number.

BRIEF DESCRIPTION OF THE DRAWINGS

FIG. 9B1 is a view showing the node-state lists in the case of eight nodes in the embodiment of the present invention.

FIG. 9B2 is a view showing the node-state lists in the case of eight nodes in the embodiment of the present invention.

FIG. 9C1 is a view showing the node-state lists in the case of eight nodes in the embodiment of the present invention.

FIG. 9C2 is a view showing the node-state lists in the case of eight nodes in the embodiment of the present invention.

DETAILED DESCRIPTION OF THE PREFERRED EMBODIMENTS

In a distributed database of a peer-to-peer network in which plural nodes are interconnected with one another, a measure and a method will be described, by which the respective nodes obtain information of a life/death state of other nodes.

<Network Architecture>

Figure 4:
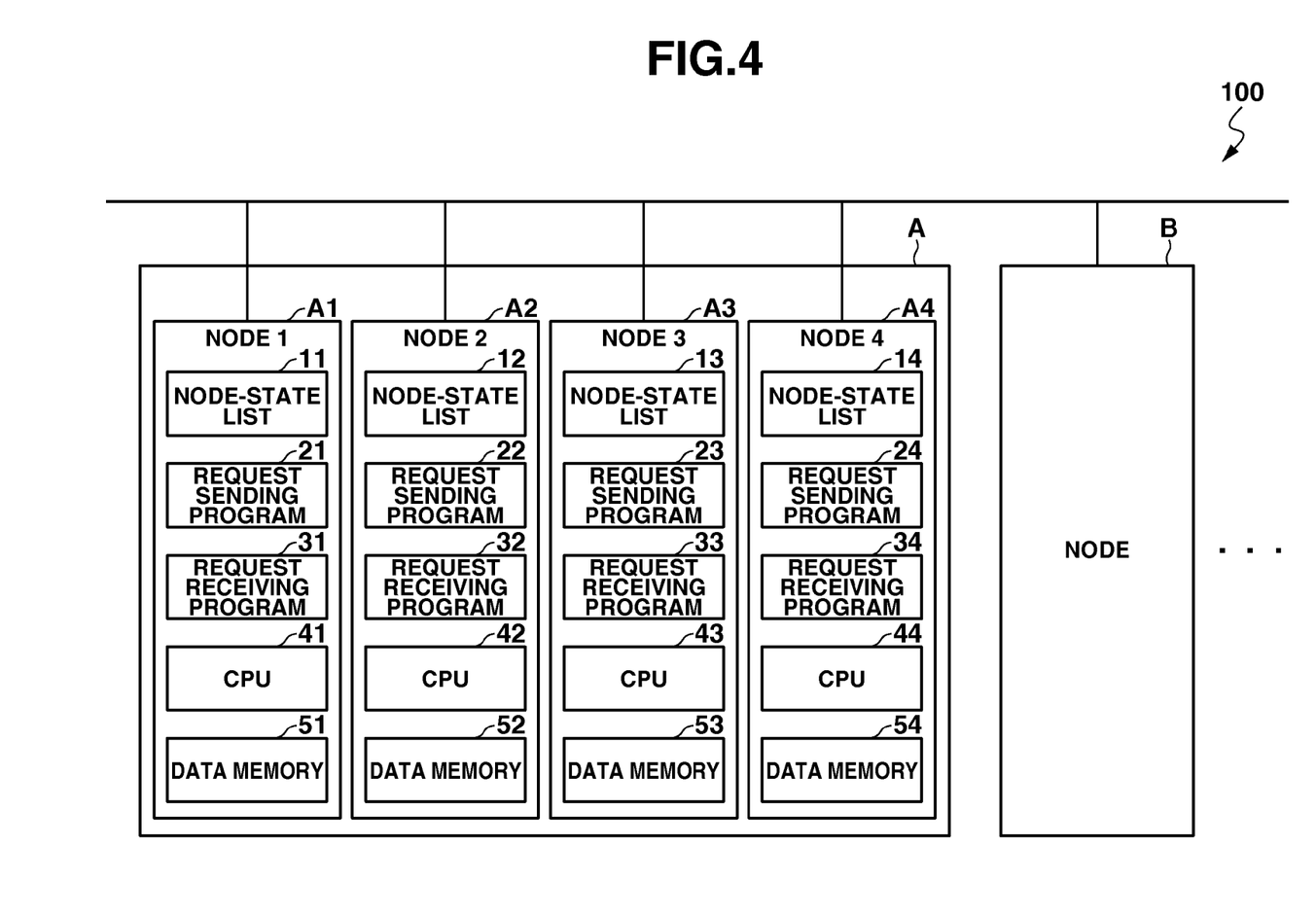
FIG. 4 is a block diagram schematically showing a network-connection architecture in the embodiment of the present invention.

FIG. 4 is a block diagram schematically showing a network-connection architecture, that is, one embodiment of the present invention. In FIG. 4, references "A1" to "A4" and "B" denote personal computers PC and servers (hereinafter referred to as "node" or "nodes") which are interconnected on a network 100.

The nodes "A1" to "A4" are the nodes which compose the same group "A". The nodes "B" represent the nodes which do not belong to the group "A".

The nodes "A1" to "A4" have node-state lists 11, 12, 13, and 14, request-sending node-information processing programs 21, 22, 23, and 24, request-receiving node-information processing programs 31, 32, 33, and 34, CPU 41, 42, 43, and 44, and data memories 51, 52, 53, and 54, respectively, as shown in FIG. 4.

The node-state lists 11, 12, 13, and 14 store state-lists, respectively, wherein each state-list contains information of "sending a request", that is, to which node a request is to be sent, information of "receiving a request", that is, from which node a request is to be received, and information of whether information of a life/death state of a node has been received or not, as will be explained with reference to FIG. 5A to FIG. 5E, FIG. 7A to FIG. 7D, and FIG. 9A. to FIG. 9D.

CPU 41, 42, 43, and 44 have a communications protocol to control the nodes. CPU 41, 42, 43, and 44 execute the request-sending node-information processing programs 21, 22, 23, and 24, and the request-receiving node-information processing programs 31, 32, 33, and 34, respectively, thereby periodically executing node-information sharing processes (to be described later). The request-sending node-information processing program and the request-receiving node-information processing program are described separately for convenience sake, but actually, can be written into a single integrated program. The request-sending node-information processing programs 21, 22, 23, and 24, and the request-receiving node-information processing programs 31, 32, 33, and 34 are installed into the nodes, respectively.

The nodes in the group are subjected to clock synchronization by Network Time Protocol (NTP). When separate nodes have different node-state lists around the same time respectively, each node stores information of such node-state lists together with the time at which such information has been obtained in order to make a conflict consistent. When plural pieces of node-information are entered, the node-information which is obtained at the latest time is employed.

The data memories 51, 52, 53, and 54 store various sorts of data, and also store a list of information indicating a residual memory capacity and information indicating performance (performance information), which are obtained from the nodes. The time at which the information has been obtained is also stored in the data memory together with such information. It is possible to form the node-state lists 11, 12, 13, and 14 within the data memories 51, 52, 53, and 54, respectively. On the contrary, it is possible to store the information of a residual memory capacity and the performance information obtained from the nodes in the node-state lists 11, 12, 13, and 14.

<Schematic Description of Operation>

The operation of the embodiment of the invention will be described with reference to a flow chart in detail. The schematic operation will be described first.

1. Node Registration (0) The node which has already been registered in a group will be registered first.

(1) The node will be registered to the group. When the total number "N" of the nodes are registered to the group, an Identification Number is given to each of the nodes, whereby the node is identified within the group. The nodes are denoted as follows: Node [1], Node [2], Node [3], . . . , Node [N], . . . , Node [M].

(2) Each node has a list which contains node-information (information of a life/death state of other node) of all the nodes. Every time when a node is registered in the group, a list is produced for the node.

When the node is connected with other node to obtain information, a connection order is determined as follows: Node [N]-->Node [N+1]. The last node in the connection order obtains information form the leading node as follows: Node [N]-->Node [1].

(3) The latest node-state list is delivered among all the nodes in the group.

2. Node Processing (4) Node [N] sends Node [N+1] a request for information together with the list of Node [N].

(5) Upon receipt of the request from Node [N], Node [N+1] sends back Node [N] information of the list of Node [N+1] in addition to the list obtained from Node [N].

(6) Node [N] adds the information obtained from Node [N+1] to its own list.

(7) Similarly, when Node [N] receives a request from Node [N-1], Node [N] sends back Node [N-1] information of the list of Node [N] in addition to the list obtained from Node [N-1].

(8) When receiving a request again, Node [N] returns to the process (4), repeatedly performing the subsequent processes.

3. In the case where a fresh node has participated in the group.

(9) The number "N" of nodes is increased. When the number "N" of nodes reaches the upper limit number "M", the nodes are separated into two groups: A group and B group. The nodes from Node [1] to Node [M/2] belong to A group and the nodes from Node [M/2+1] to Node [M] belong to B group.

(10) Node [M/2] is connected to Node [1] and Node [M] is connected to Node [M/2+1], forming two rings. Information is shared among the separated nodes in the same manner as before they are separated.

(11) When a prescribed period of time has passed, that is, when information has been shared among the nodes in one group, a node in one group is connected to another node in another group. For instance, Node [N] in A group is connected to Node [N+M/2] in B group.

4. In the case where no response is sent back from other node.

(12) Node [x] which has not sent back responses "K" times or more is deemed to halt. Then, a request is sent to the succeeding Node [x+1] (Node [x−1]—>Node [x+1]).

(13) When Node [x] has sent back abnormal responses K times or more, data sent from Note [x] is deemed not to be stored. Then, a request is sent to the succeeding Node [x+1] (Node [x−1]—>Node [x+1]).

(14) When Node [x] which was once deemed to halt can be connected to again, such Node [x] will be accepted to come back to life and a request will be sent to such Node [x], again.

FIG. 7A to FIG. 7D are views showing the node-state lists in the case where four nodes participate in the group.

FIG. 8A to FIG. 8D are views for explaining operations of requesting for information in the case of the four nodes.

FIG. 9A to FIG. 9D are views showing the node-state lists in the case where eight nodes participate in the group.

Figure 10A:
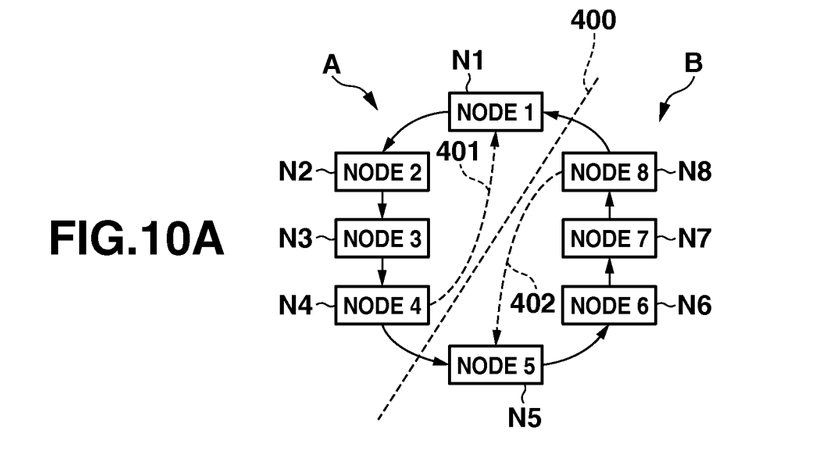
FIG. 10A is a view showing operations of requesting for information in the case of eight nodes in the embodiment of the present invention.
Figure 10B:
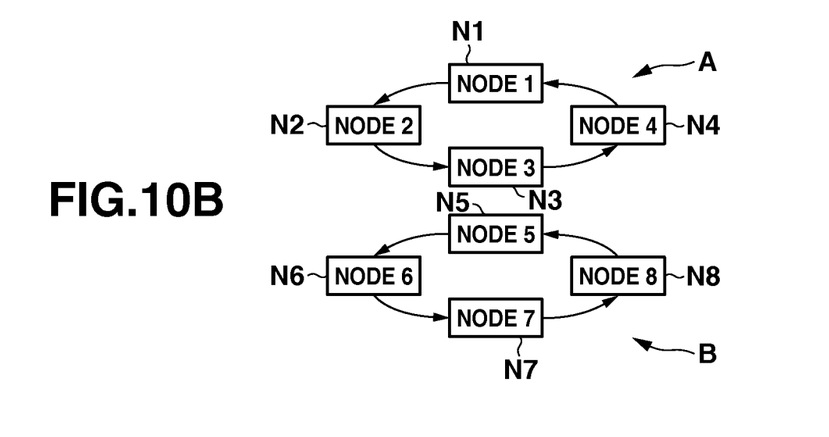
FIG. 10B is a view showing operations of requesting for information in the case of eight nodes in the embodiment of the present invention.
Figure 10C:
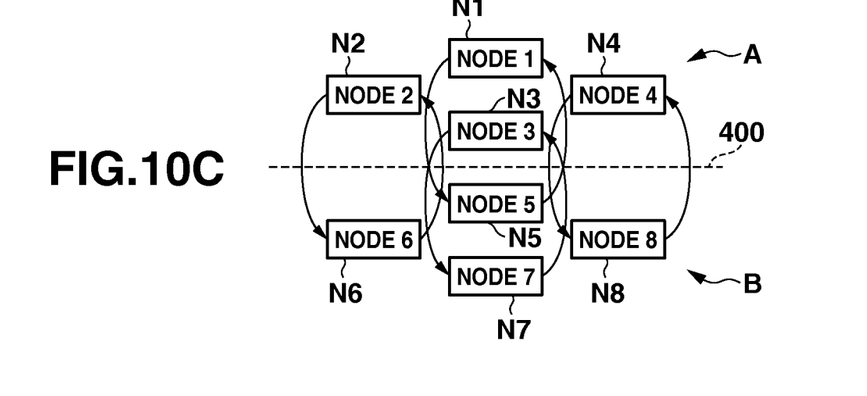
FIG. 10C is a view showing operations of requesting for information in the case of eight nodes in the embodiment of the present invention.

FIG. 10A to FIG. 10O are views for explaining operations of requesting for information in the case of the eight nodes.

For making it easy to compare with the general operation of requesting for information of a protocol illustrated in FIG. 5A to FIG. 5D and in FIG. 6A to 6E and the operation of requesting information (prior art), the operation in the present embodiment will be described with reference to FIG. 7A to FIG. 7D and FIG. 10A to 10O.

FIG. 7A to FIG. 7D correspond respectively to FIG. 8A to FIG. 8D. It is assumed in FIG. 8A to FIG. 8D that four nodes have participated in the group. A request R1 for information from the node [N1] to the node [N2], a request R2 for information from the node [N2] to the node [N3], a request R3 for information from the node [N3] to the node [N4], and a request R4 for information from the node [N4] to the node [N1] are equally privileged.

Figure 7A:
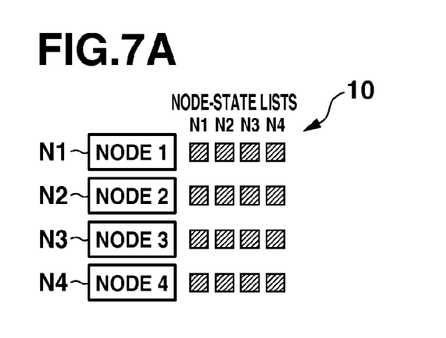
FIG. 7A is a view of node-state lists of four nodes in the initial state in the embodiment of the present invention.

FIG. 7A is a view showing an initial state where information has not been shared between the four nodes N1 to N4.

Figure 7B:
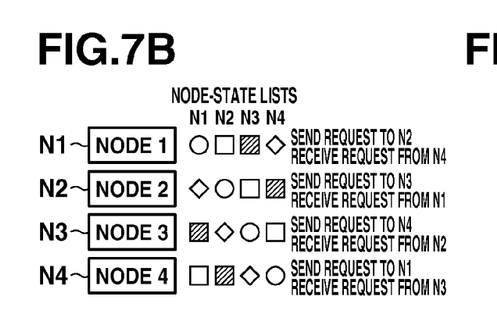
FIG. 7B is a view of the node-state lists of the four nodes in the embodiment of the present invention.
Figure 8A:
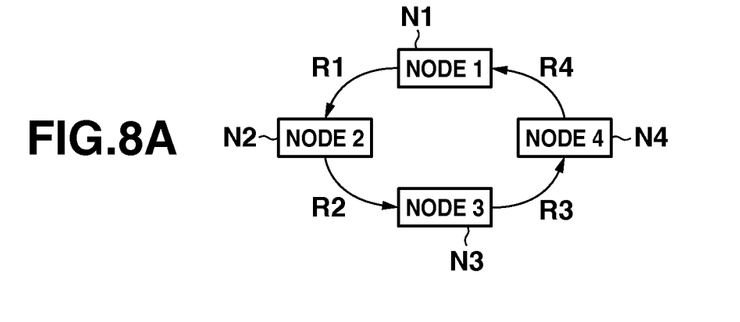
FIG. 8A is a view showing operations of requesting for information in the case of four nodes in the embodiment of the present invention.
Figure 8B:
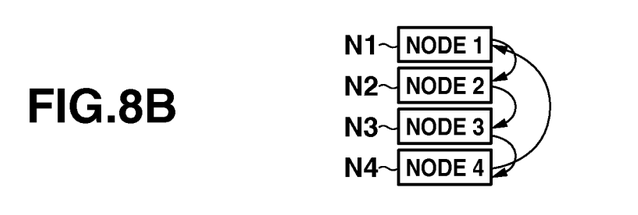
FIG. 8B is a view showing operations of requesting for information in the case of four nodes in the embodiment of the present invention.

FIG. 7B and FIG. 8B are views showing the following states. The node [N1] sends the request for information to the node [N2]. The node [N2] sends the request for information to the node [N3]. The node [N3] sends the request for information to the node [N4]. The node [N4] sends the request for information to the node [N1]. Meanwhile, the node [N1] receives the request for information from the node [N4]. The node [N2] receives the request for information from the node [N1]. The node [N3] receives the request for information from the node [N2]. The node [N4] receives the request for information from the node [N3].

Figure 7C:
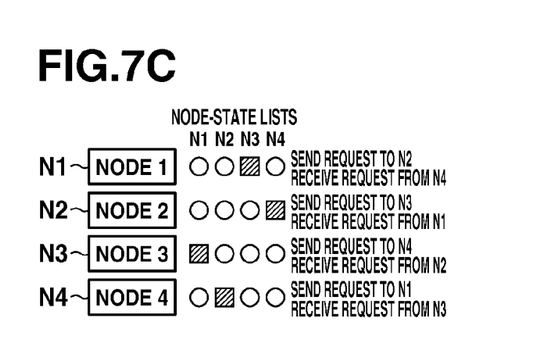
FIG. 7C is a view of the node-state lists of the four nodes in the embodiment of the present invention.
Figure 8C:
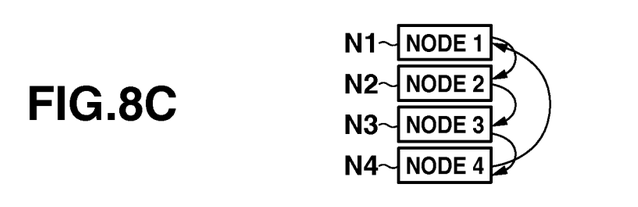
FIG. 8C is a view showing operations of requesting for information in the case of four nodes in the embodiment of the present invention.

FIG. 7C and FIG. 8C are views showing the further following states.

Figure 7D:
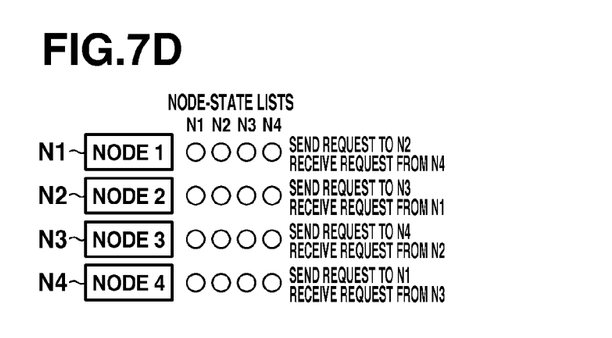
FIG. 7D is a view of node-state lists of the four nodes in the steady state in the embodiment of the present invention.
Figure 7E:
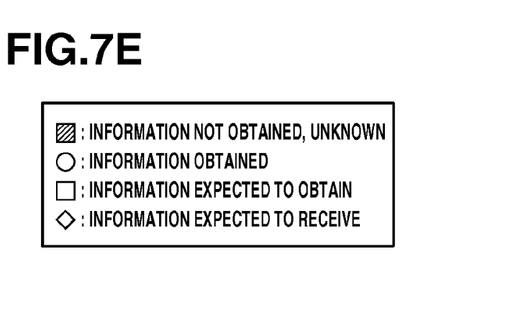
FIG. 7E is a view of explanatory notes of symbols used in FIG. 7A to FIG. 7D.
Figure 8D:
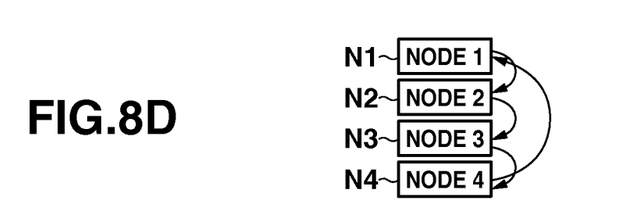
FIG. 8D is a view showing operations of requesting for information in the case of four nodes in the embodiment of the present invention.

FIG. 7D is a view showing all the nodes in a steady state, where every node has received information form all other nodes. Relationships between all the requests sent to other nodes and relationships between all the requests received from other nodes are in the same states, as illustrated in FIG. 8B, FIG. 8C and FIG. 8D.

As will be understood from FIG. 8A, the node [N1] sends a request to the node [N2] and receives a request from the node [N4]. Similarly, every node sends a request to other node and receives a request from the other node. The number of sending a request and the number of receiving a request are even for every node.

The node [N1] receives node-information of the node [N4] through the node [N2] and the node [N3]. Every node is brought in clock synchronization by Network Time Protocol (NTP), and therefore, the node [N1] can receive node-information which the node [N2] and the node [N3] have obtained simultaneously. In general, the time at which such node-information has been obtained is stored together with in the node-state list 10. When plural pieces of node-information are received, the node-information of the latest time is employed.

FIG. 9A to FIG. 9D and FIG. 10A to FIG. 10C are views for explaining operations of sending a request for information in the case where additional nodes have participated in the group. It is assumed that the upper limit number "M" of nodes is 8, and the case where M is 8 will be explained.

Figure 9A:
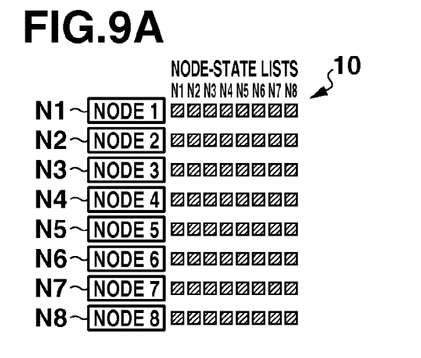
FIG. 9A is a view showing the node-state lists in the case of eight nodes in the embodiment of the present invention.

FIG. 9A is a view showing the 8 nodes which have not been separated into plural groups. The 8 nodes [N1 to N8] are in the initial state and do not share information. The number of node-state lists 10 increases to 8 for 8 nodes [N1 to N8].

Figure 9B:
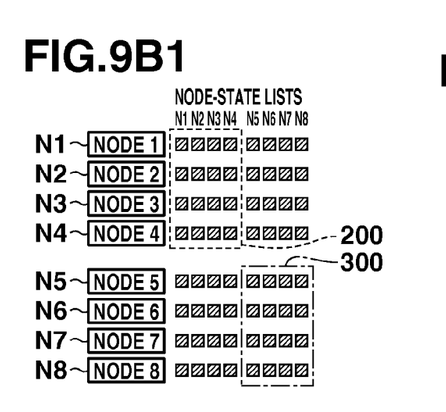

FIG. 9B1 is a view showing the nodes which are separated into two groups. The node-state lists 10 hold the state indicating the nodes which are not separated into plural groups. Upon receipt of the initial node-information, information of the node-state lists falling within an area 200 is renewed for the group of nodes [N1 to N4], and information of the node-state lists falling within an area 300 is renewed for the group of nodes [N5 to N8].

FIG. 9B2 is a view showing that a node state is shared between all the nodes in the two groups. A transition of the node state of the nodes [N1 to N4] from shown in FIG. 9B1 to shown in FIG. 9B2 is substantially the same as the transition of the node state of nodes [N1 to N4] from shown in FIG. 7A to shown in FIG. 7D. Similarly, a transition of the node state of the nodes [N5 to N8] from shown in FIG. 9B1 to shown in FIG. 9B2 is substantially the same as the transition of the node state of nodes [N1 to N4] from shown in FIG. 7A to shown in FIG. 7D. In the renewed node-state lists 10, the information in the area 200 will be renewed to information in the area 210 and the information in the area 300 will be renewed to information in the area 310, as shown in FIG. 9B2.

Figure 9B:
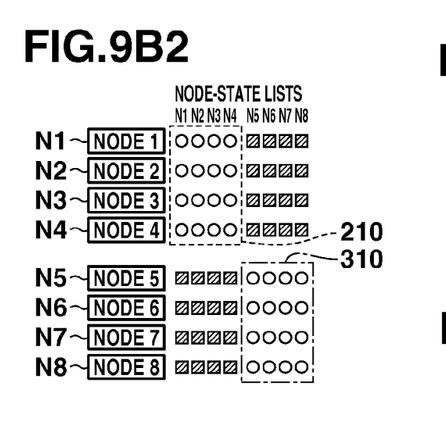
Figure 9C:
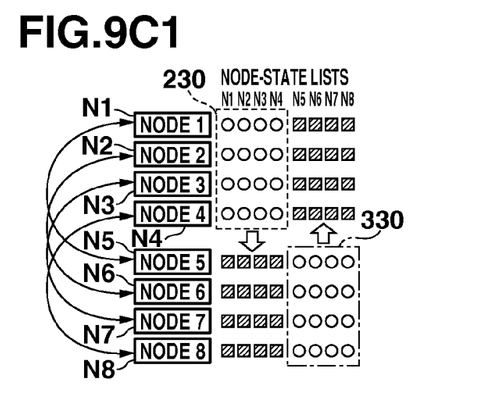
Figure 9C:
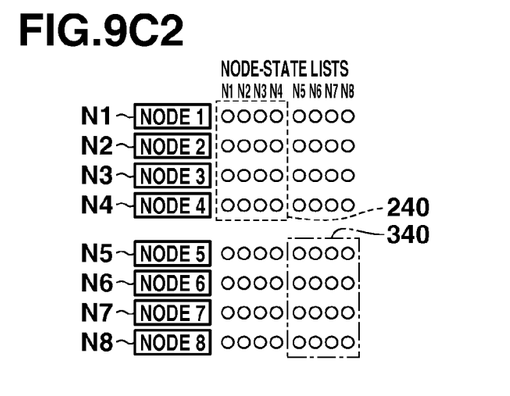
Figure 9D:
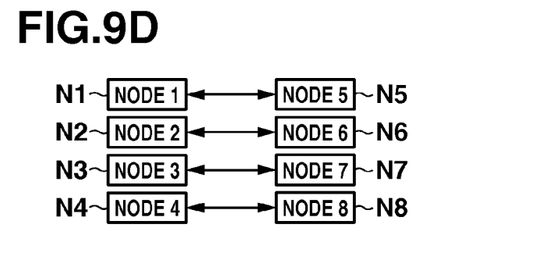
FIG. 9D is a view showing operations of requesting for information in the case of eight nodes in the embodiment of the present invention.
Figure 9E:
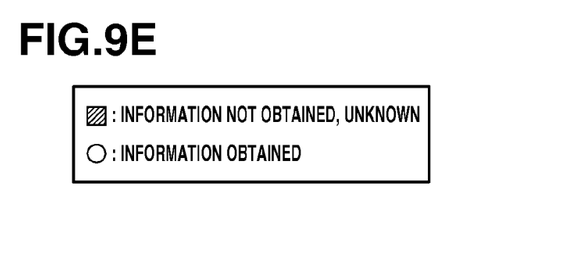
FIG. 9E is a view of explanatory notes of symbols used in FIG. 7A to FIG. 9C2.

FIG. 9C1 and FIG. 9C2 are views showing that the nodes having the node-state lists shown in FIG. 9B2 send requests for information to other nodes belonging to the separate group. FIG. 9C1 is a view showing that the nodes [N1, N2, N3, and N4] are sending requests for information to other nodes [N5, N6, N7, and N8] in the separate group, respectively, and vice versa.

FIG. 9C2 is a view showing that the nodes [N1, N2, N3, and N4] have received information from other nodes [N5, N6, N7, and N8] in the separate group, respectively, and vice versa. More specifically, FIG. 9C2 shows that the node [N1] has obtained from the area 230 the information of the nodes (N5 to N8) obtained by the node [N5] and falling in the area 240 defined in the node-state lists 10. Similarly, FIG. 9C2 shows that the node [N5] has obtained from the area 330 the information of the nodes [N1 to N4] obtained by the node

[N1] and falling in the area 340 defined in the node-state lists 10. The same is applied to the node [N2]and the node [N6], the node [N3] and the node [N7], and the node[N4]and the node [N8].

Now, all the nodes have obtained the node states of all the nodes, and return to the state shown in FIG. 9B1.

FIG. 10A to FIG. 10C are views illustrating how the requests for information have been sent and/or received between the nodes, shown in FIG. 9A, FIG. 9B1, FIG. 9B2, FIG. 9C1, and FIG. 9C2. FIG. 10A corresponds to FIG. 9A, FIG. 10B corresponds to FIG. 9B1 and FIG. 9B2, and FIG. 10C corresponds to FIG. 9C1 and FIG. 9C2, respectively.

When the number of participating nodes has increased more than a prescribed number, the participating nodes are separated into two groups, for example, by a broken line 400, as shown in FIG. 10A. When separated into two groups, the node [N4] is connected to the node [N1] as shown by a broken line 401, and the node [N8] is connected to the node [N5] by a broken line 402. The nodes are separated into plural groups depending on the number of participating nodes. When information has been shared among the nodes in one group, then information is obtained from the nodes in other group and the obtained information is shared among the nodes within one group, again.

If the number of participating nodes in any group exceeds 8, the nodes will be separated into three groups. When the information has been shared among the nodes in one group, then requests for information are sent to the nodes in other group regardless of the number of groups. The upper limit of nodes is not restricted to 8. The route of delivering the information is not always restricted to the order defined in the above "1. Node Registration". The information can be delivered in any order.

<Specific Operation>

Figure 1:
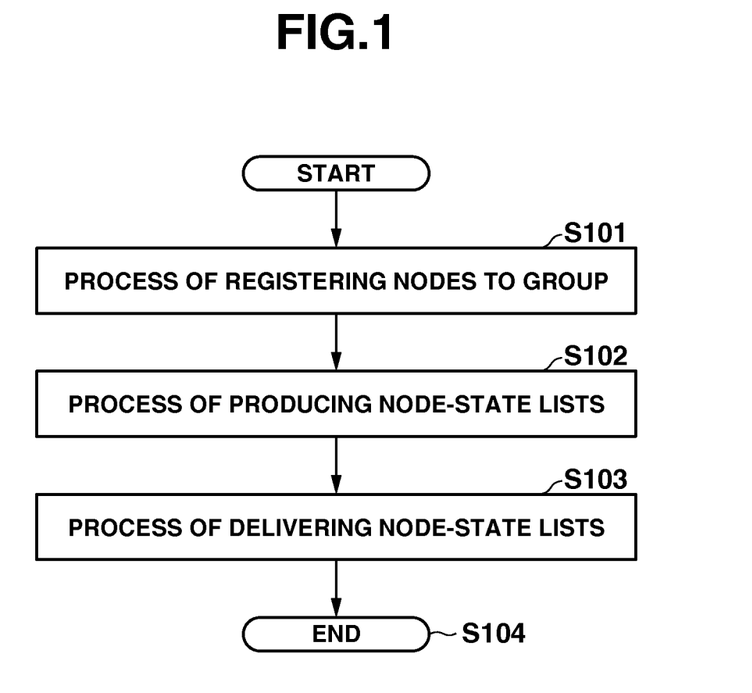
FIG. 1 is a flow chart of a process of registering nodes in a group performed the embodiment of the invention.

The communicating operations in the embodiment of the present invention will be described with reference to the accompanying flow charts. The flow charts show the processes to be performed by CPU provided in the respective nodes. FIG. 1 is a flow chart of a process of registering nodes performed in the embodiment of the present invention.

A process of registering nodes to a group is performed at step S101. For instance, a process is performed to register a node to the group "A" shown in FIG. 4. Each node is given an Identification Number in the order of registration. The Identification Numbers of the nodes are stored in the memories 51 to 54, respectively. The process is performed to produce a database of "NoSQL" (Not only SQL) using plural servers (nodes).

Then, the node-state lists of the nodes are produced at step S102. The node-state lists of the nodes correspond to the node-state lists 10 shown in FIG. 5A and/or FIG. 7A. The produced node-state lists are added respectively to the corresponding Identification Numbers as data representing states of the nodes registered at step S101.

A changed node-state list is delivered to all the nodes belonging to the same group at step S103, whereby the changed node-state list is shared between the nodes within the same group. Then, the process of registering nodes to the group finishes at step S104.

Figure 2:
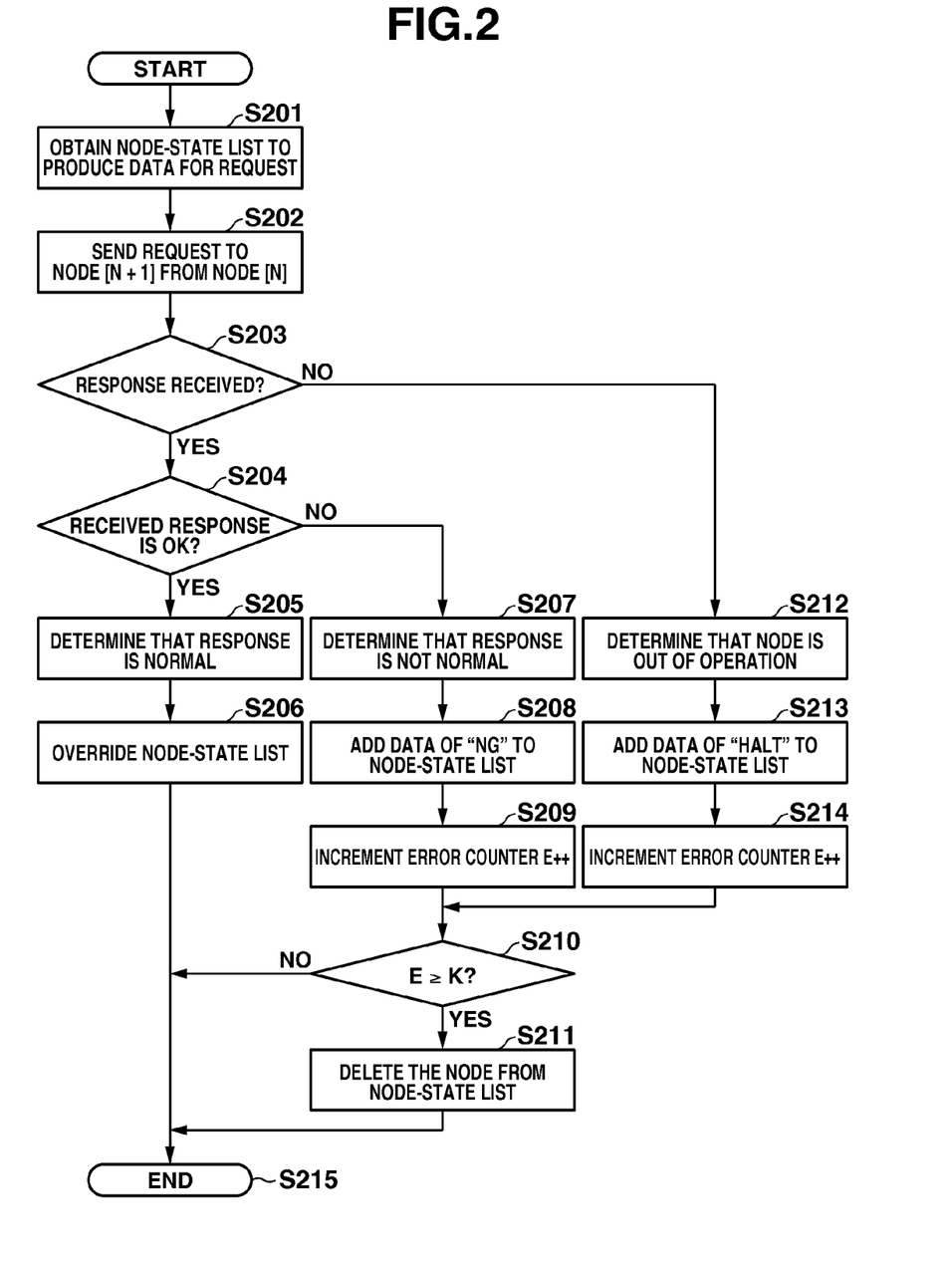
FIG. 2 is a flow chart of a process of sharing node-information among nodes (a request sending process) performed in the embodiment of the invention.

FIG. 2 is a flow chart of a process of sharing node-information among nodes (a request sending process) performed in the embodiment of the present invention. It is assumed in the present embodiment that a request for information is sent periodically.

A node (CPU of Node [N]) obtains information of its own node-state list at step S201 to produce data for sending a request. CPU of Node [N] sends the request to Node [N+1] at step S202. CPU of Node [N] waits for a response from Node [N+1] at step S203. Upon Receipt of the response from Node [N+1] (YES at step S203), CPU of Node [N] advances to step S204. When receiving no response from Node [N+1] (NO at step S203), CPU of Node [N] advances to step S212.

CPU of Node [N] judges at step S204 whether the received response is reasonable, that is, judges whether the response is "OK" or "NG". When it is determined that the received response is "OK" (YES at step S204), CPU of Node [N] advances to step S205. When it is determined that the received response is "NG" (NO at step S204), CPU of Node [N] advances to step S207.

CPU of Node [N] determines that the response is normal at step S205, advancing to step S206. CPU of Node [N] overrides a part of the node-state list to be renewed with the received node-state list (received response) and stores the renewed node-state list in the memory at step S206. Then, CPU of Node [N] finishes the node-information sharing process at step S215.

CPU of Node [N] determines that the response is not normal at step S207, advancing to step S208. CPU of Node [N] determines that the node-state list received from Node [N+1] is "NG", and sets the data to be renewed with "NG" and does not renew its own node-state list at step S208, and then advances to step S209.

CPU of Node [N] increments a counter E (not shown) at step S209, and advances to step S210. The counter E counts the number "E" of times of continuous failures.

CPU of Node [N] judges at step S210, whether the number "E" of times of failures counted by the counter E has reached an upper limit value "K" or more. When it is determined that the number "E" of times of failures has reached the upper limit value "K" or more (YES at step S210), CPU of Node [N] advances to step S211. Meanwhile, when it is determined that the number "E" of times of failures is less than the upper limit value "K" (NO at step S210), CPU of Node [N] advances to step S215.

When the number "E" of times of failures has reached the upper limit value "K" or more (YES at step S210), CPU of Node [N] deletes Node [N+1] from the node-state list of the node [N] and sets in the node-state list the following node as a node to which a request is to be sent at step S211. Then, CPU of Node [N] finishes the process at step S215.

Meanwhile, when no response is received from Node [N+1] (NO at step S203), CPU of Node [N] determines that Node [N+1] is out of operation, or, that Node [N+1] halts the operation (step S212), and advances to step S213. Since no response has been received at step 213, any renewal is not made on the node-state list. Then, CPU of Node [N] advances to step S214, incrementing the counter E, and further advances to step S210.

In the process (a request sending process) described above, the information has been shared between all the nodes participating in the group.

Figure 3:
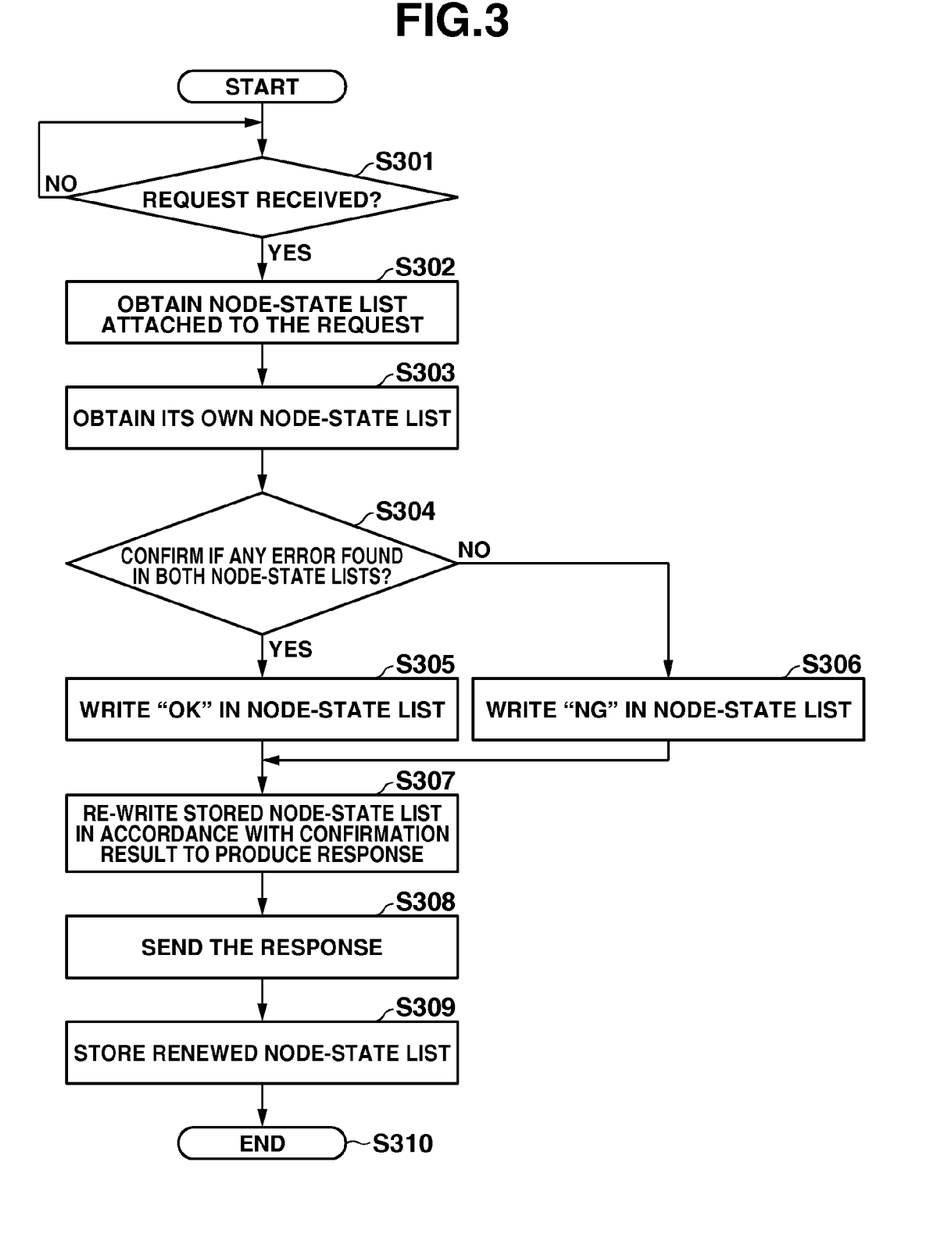
FIG. 3 is a flow chart of a process of sharing node-information among nodes (a request receiving process) performed in the embodiment of the invention.

FIG. 3 is a flow chart of a process of sharing node-information among nodes (a request receiving process) performed in the embodiment of the present invention. It is assumed in the present embodiment that the node waits for a request sent from other node.

CPU of Node [N] judges at step S301 whether a request has been received from other node. When it is determined that a request has been received from other node (YES at step S301), CPU of Node [N] advances to step S302.

CPU of Node [N] obtains a node-state list attached to the received request at step S302. Further, CPU of Node [N] confirms its own state, that is, obtains its own note-state list at step S303.

CPU of Node [N]' confirms at step S304, whether any error is found in its own node-state list and the received node-state list. When it is determined that no error has been found in its own node-state list and the received node-state list, that is, when it is determined that the confirmation result is "OK" (YES at step S304), CPU of Node [N] advances to step S305. When it is determined that an error has been found in its own node-state list and the received node-state list, that is, when it is determined that the confirmation result is "NG" (NO at step S304), then CPU of Node [N] advances to step S306.

CPU of Node [N] writes it in the node-state list that no error has been found in the node-state lists or that the confirmation result is "OK" (step S305), and also writes it in the node-state list that an error has been found in the node-state lists or that the confirmation result is "NG" (step S306), and then advances to step S307.

CPU of Node [N] re-writes the stored node-state list in accordance with the confirmation result (step S304) to produce a response at step S307, and sends the response at step S308.

CPU of Node [N] renews its own data with the node-state list obtained at step S302 and further overrides its own node-state list with the renewed data, storing the overridden node-state list at step S309. Then, the node-information sharing process (a request receiving process) finishes at step S310.

As described above, in the distributed database of a peer-to-peer network, in which plural nodes are interconnected, information is shared between the plural nodes without failure.

In the distributed database of a peer-to-peer network according to the embodiment of the present invention, information is delivered through the established route, and therefore, even if the participating nodes increase, the task of the network does not increase. Further, when the participating nodes increase more than a predetermined number, the participating nodes are separated into plural groups. Therefore, information can be shared among the group within a prescribed period of time.

Further, since information is exchanged along the specific route, tasks do not concentrate on particular nodes in the group, and information can periodically be shared between all the nodes.

Furthermore, in the embodiment of the invention, when sending a request for information, the node sends its own information together with the request, and therefore, the request sending node and the request receiving node can collect the information of the both nodes, and the information stored in the both nodes can be shared between them.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

DESCRIPTION OF REFERENCE NUMERALS AND SIGNS 10, 11, 12, 13, 14: Node-state lists
21, 22, 23, 24: Request-sending node-information processing programs
31, 32, 33, 34: Request-receiving node-information processing programs
41, 42, 43, 44: CPU
51, 52, 53, 54: Data memories
100: Network
A1 to A4: Servers
N[1] to N[8]: Nodes
A, B: Groups

What is claimed is:

1. A distributed database of a peer-to-peer network in which a group is composed of plural nodes, wherein
the plural nodes in the group each have CPU and a state list memory;
the state list memory stores node-state information which CPU of one of the plural nodes has obtained from other node by sending a request for information;
CPU of each of the plural nodes delivers the node-state information through a prescribed route among the nodes in the group; and
a node-state list is renewed in order of registration of a node when the node is registered in the group, and the node registered in the end is connected so as to make a link of nodes in the group by obtaining prescribed information of a leading node in the order of registration; and
when the number of nodes has reached the upper limit M, the nodes in the group are divided into a first group including the nodes [1]-[M/2] and a second group including the nodes [M/2+1]-[M], and the node [M/2] is connected with the node [1] and the node [M] is connected with the node [M/2+1]; and
when the node-state information has been shared among all the nodes in each group, one of the nodes in the group is connected with a node in another group.

2. The distributed database according to claim 1, wherein when the node-state information has been shared among all the nodes within the group, then CPU of the node in the group sends a request for node-state information to a node in other group.

3. The distributed database according to claim 1, wherein CPU of the node sends other node a request for information of a life/death state.

4. The distributed database according to claim 3, wherein when CPU of the node has received information of a death state from the other node, then said other node is deleted from the group.

5. The distributed database according to claim 1, wherein CPU of the node sends other node a request for information of a remaining capacity of the state list memory or information of performance of other node.

6. A method of sharing data in a distributed database of a peer-to-peer network which is composed of plural nodes, the method comprising:
a first process of registering plural nodes in a group;
a second process of delivering information through a prescribed route within the group, whereby each node obtains information of other nodes and shares the information among the plural nodes in the group; and
a third process of separating the nodes into plural groups, when the number of nodes participating in the group has increased more than a prescribed number, wherein in the third process, when the number of nodes has reached the upper limit M, the nodes in the group are separated into a first group including the nodes [1]-[M/2] and a second group including the nodes [M/2+1]-[M], and the node [M/2] is connected with the node [1] and the node [M] is connected with the node [M/2+1]; and when the node-state information has been shared among all the nodes in each group, one of the nodes in the group is connected with a node in another group.

7. The method of sharing data in a distributed database of a peer-to-peer network according to claim 6, wherein the first process comprises:
a process (1) which registers the nodes in the group, and gives an identification number to each of the nodes in the group while registering the total number N of nodes in the group, whereby each node is identified in the group by the identification number given to said node;

a process (2) which renews list-information of the nodes in the order in which the nodes are registered in the group, wherein all the nodes each have the list-information indicating a state of the node in the group, and makes the last registered node link with the first registered node to obtain the list-information of said first registered node; and a process (3) which delivers the renewed list-information to all the nodes in the group.

8. The method of sharing data in a distributed database of a peer-to-peer network according to claim 6, wherein the third process comprises:

a process (9) which increases the participating nodes and separates the participating nodes into two groups, a first group and a second group, when the number N of the participating nodes reaches an upper limit number M, whereby the nodes from the node [1] to the node [M/2] are included in the first group and the nodes from the node [M/2+1] to the node [M] are included in the second group;

a process (10) which makes the node [M/2] interconnect with the node [1] and the node [M] interconnect with the node [M/2+1]; and a process (11) which makes the node in one of the groups interconnect with other node in the other group, when information has been shared among all the nodes in said one of the groups.

9. The method of sharing data in a distributed database of a peer-to-peer network according to claim 6, wherein the second process further comprises:

a process (12) in which a node [x] sends a request to a following node in connection order, when the node [x] receives no response more than K times in the process (7) or when the node [x] receives an abnormal response.

10. A non-transitory computer-readable storage medium with an executable program stored thereon, wherein the program is for sharing information in a distributed database of a peer-to-peer network composed of plural nodes, each node having a computer, and instructs the computer of a node [N] to perform the following processes:

a process which registers plural nodes in a group;

a process which sends a node [N+1] a request for information together with list-information of the node [N], wherein the list-information of the node [N] indicates a state of the node [N];

a process which receives a response from the node [N+1], wherein the response contains the list-information of the node [N] added with the list-information of the node [N+1];

a process which adds the information received from the node [N+1] to the list-information of the node [N];

a process which sends back a response to a node [N−1] in response to a request from the node [N−1], wherein the response contains the list-information sent from the node [N−1] added with the list-information of the node [N]; and a process which separates nodes in the group into a first group including the nodes [1]-[M/2] and a second group including the nodes [M/2+1]-[M], when the number of nodes has reached the upper limit M, and a process in which one of the nodes in the group is connected with a node in another group, when the node-state information has been shared among all the nodes in each group.

11. An apparatus for sharing information in a distributed database of a peer-to-peer network composed of plural nodes, wherein a node [N] among the plural nodes has a computer which performs the following processes:

a process which registers plural nodes in a group;

a process which sends a node [N+1] a request for information together with list-information of the node [N], wherein the list-information of the node [N] indicates a state of the node [N];

a process which receives a response from the node [N+1], wherein the response contains the list-information of the node [N] added with the list-information of the node [N+1];

a process which adds the information sent from the node [N+1] to the list-information of the node [N];

a process which sends back a response to a node [N−1] in response to a request from the node [N−1], wherein the response contains the list-information sent from the node [N−1] added with the list-information of the node [N]; and a process which separates nodes in the group into a first group including the nodes [1]-[M/2] and a second group including the nodes [M/2+1]-[M], when the number of nodes has reached the upper limit M, and a process in which one of the nodes in the group is connected with a node in another group, when the node-state information has been shared among all the nodes in each group.

* * * * *